Jan. 17, 1928.

H. L. HORNING
LUBRICATING SYSTEM
Filed June 8, 1925

1,656,200

Inventor:
Harry L. Horning

Patented Jan. 17, 1928.

1,656,200

UNITED STATES PATENT OFFICE.

HARRY L. HORNING, OF WAUKESHA, WISCONSIN, ASSIGNOR TO WAUKESHA MOTOR COMPANY, OF WAUKESHA, WISCONSIN, A CORPORATION OF WISCONSIN.

LUBRICATING SYSTEM.

Application filed June 8, 1925. Serial No. 35,529.

This invention relates to improvements in lubricating systems and more particularly to improvements in lubricating systems for engines of the internal combustion type.

The objects of the invention are to provide a generally improved system for removing deleterious and any other foreign matter from the lubricant continuously with the running of the engine and without in any way impairing or otherwise affecting the proper lubrication of the bearings or other parts should there be any clogging, stoppage or undue retardation in the filter or should it otherwise fail to operate properly and a system in which the lubricant may be properly forced or otherwise positively delivered to the parts to be lubricated to assure proper lubrication thereof at all times.

According to my invention, an oil filter adapted to actually filter the oil, as distinguished from merely straining the same, may be employed. The oil may thereby be entirely cleansed of abrasive particles and all other foreign matter tending to score, wear or interfere with proper lubrication of the bearing surfaces of the engine.

Figure 1:
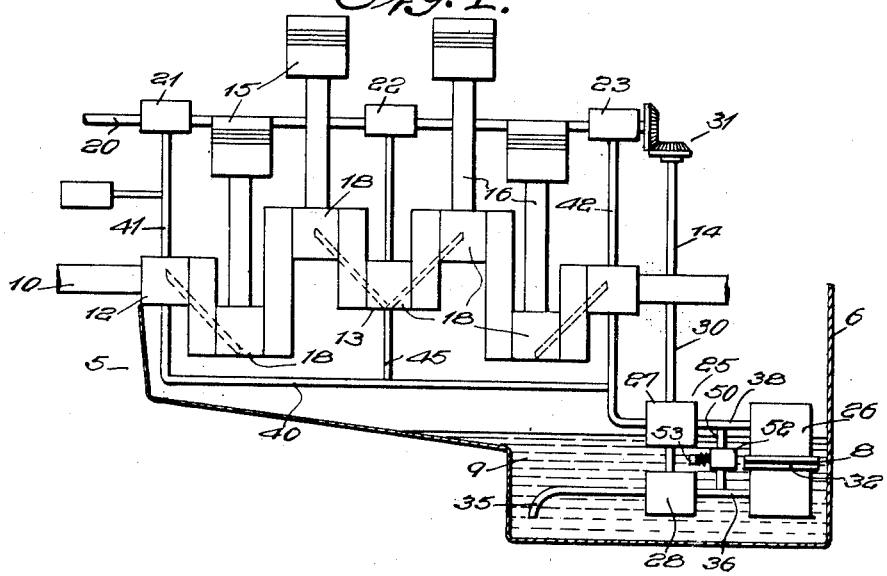
Figure 2:
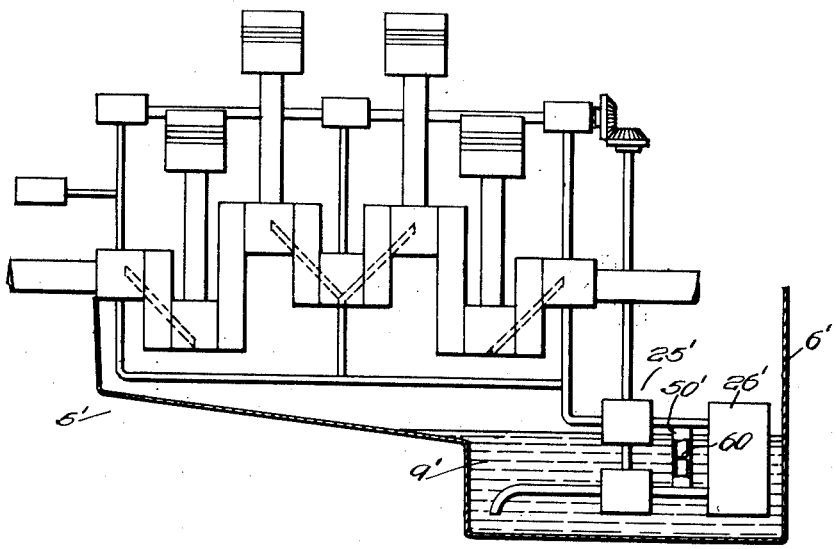

The invention is illustrated in the accompanying drawing, in which:

Figure 1 is a diagrammatic and more or less schematic view showing the crank case and crank shaft of an internal combustion engine with the parts to be lubricated and an embodiment of my invention in connection therewith; and Figure 2 is a similar view showing a modified embodiment of the invention.

Referring to the drawings, 5 designates an internal combustion engine of any suitable type having a crank case 6 which may contain the oil for lubricating the bearings or other co-acting moving parts of the engine. The particular crank case shown has a depending sump 8 and the oil or lubricant is indicated in this sump at 9.

The crank shaft of the engine is indicated at 10 and it is shown as having a main front bearing 12, a main intermediate bearing 13 and a main rear bearing 14. The pistons of the engine are indicated at 15, the connecting rods at 16 and the journaling or bearing connections of the connecting rods 16 upon the crank shaft 10 are indicated at 18. The cam shaft of the engine is indicated at 20 and 21, 22 and 23 designate one arrangement of cam shaft bearings.

Suitably mounted, as for example, within the crank case 6 of the engine is suitable pumping or lubricant impelling means designated, generally, at 25 and also shown as disposed within the crank case 6, is a filter 26. It is, of course, to be understood that the particular arrangement shown is simply illustrative and that the pumping means and filters, or either of them, may be disposed outside the crank case or otherwise, as desired. The pumping or lubricant impelling means 25 is for purposes of illustration shown as being of the double pump type comprising two pumping units 27 and 28 which may, for convenience, be arranged on the vertical shaft 30 which extends up and is geared at 31 to the cam shaft 20, or the pumping means may be driven individually or together, as shown, by any other suitable moving part of the engine.

The filter 26 per se forms no part of the present invention and its details may be varied, as desired. Merely for the purpose of illustration, I have shown the same as comprising complementary shells, each having one end closed and with their open ends clamped together with a filtering element 32 clamped between them. The filtering element 32 may be of felt, fabric cloth, earthenware, chamois, kieselguhr or any other suitable or preferred material or it may even be of suitable mesh screen insofar as the present invention is concerned.

The pumping element is provided with an intake pipe 35 extending within the crank case 6 and having its open end positioned preferably adjacent the bottom of the sump 8. An outflow or discharge pipe 36 conducts the lubricant from the pumping element 28 to the inlet side of the filter 26 and a pipe 38 delivers the oil or lubricant from the outlet side of the filter to the pumping element 27. An outflow pipe 40 from the pumping element 27 serves to conduct the oil from the pumping means 25 to the bearings of the engine, or to any other parts which it is desired to lubricate.

The reference character 40 represents the tube which leads from the pumping means to the bearings or other parts requiring lubrication or it may represent ducts leading to a splash lubrication system. For purposes of illustration, the tube 40 is shown as having branches 41 and 42 to the bearings 21 and 23 and branches lead down from these branches to the bearing connections 18. A branch tube 45 leads from the tube 40 to the bearing 13 from where branches may extend to the immediate bearing connections 18 and up to the intermediate cam shaft bearing 22.

For the purpose of providing or maintaining a supply of lubricant to the bearings or other parts to be lubricated in the event of clogging or other failure of the filter 26, I provide a by-pass 50 between the line 36 from the pump to the inlet side of the filter and the line 38 from the outlet side of the filter to the pump. Interposed in the by-pass 50 is a valve 52 normally closed by a spring 53, the tension of which may be adjusted to adjust the pressure at which this by-pass valve will open. This valve 52 is a typical spring loaded by-pass valve and its details may vary as desired. Suffice it to say that this valve 52 and the by-pass 50 forms one form of connection operable by the back pressure which results upon partial or complete clogging of the filter 26 to by-pass the lubricant around the filter 26 and thereby provide or maintain a supply of lubricant to the bearings or other parts, either partially or completely independent of the filter 26. Therefore, the supply of lubricant to the parts to be lubricated will not, in any way, be affected by any increase in the resistance offered to the flow of oil through the filter or by any other partial or complete failure of the filter and consequently all abrasive and all other small foreign particles and deleterious matter is removed from the lubricant without robbing or impairing the lubricant supply to the parts to be lubricated. As already pointed out, the filter 26 may be adapted to remove all foreign matter as distinguished from the comparatively open gauze strainers of the prior art.

Under normal conditions, during the operation of the engine, the pumping means 25 withdraws oil from the crank case or sump 8 and forces it to flow continuously through the filter 26 from where it is withdrawn and forced out to the various parts to be lubricated. Any fine abrasive matter, carbon particles or other foreign matter is removed from the lubricant by the filter 26 as the lubricant is forced therethrough and the filtered lubricant flows out to the bearings. The by-pass valve 52 may, of course, be set to by-pass a part of the oil under normal conditions, providing in effect a continuous partial filtration which would free the oil of foreign matter and clear the same.

In the event of failure or partial failure of the filter 26, as for example, by clogging or partial clogging of the filtering element, the back pressure will open or increase the opening of the by-pass valve 52, by-passing a greater amount or all of the oil around the filter and to the parts to be lubricated more independently or entirely independent of the filter. Obviously, if the failure of the filter is only partial, the by-pass flow will be set up or increased to compensate for the decreased filtered flow because of the partial failure and upon total failure, the entire lubricant supply to the bearings may be independently of the filter, thereby assuring a proper lubricant supply to all parts to be lubricated at all times.

In the embodiment of the invention illustrated in Figure 2, I have shown the by-pass connection 50' as being provided with a restricted orifice instead of with a spring valve. This restricted orifice 60 obviously provides a restriction to the by-pass flow of oil around the filter 26', so that in normal operation some of the oil will flow through the orifice 60 and to the bearings or other parts to be lubricated independently of the filter and the back pressure set up by the restriction of said orifice will cause the remainder of the oil withdrawn from the sump 9' by the pumping means 25' and forced through the system to pass through the filter and then out to the bearings and other parts to be lubricated. In the event of clogging, partial clogging or other failure of the filter 26', the back pressure or partial back pressure set up thereby will increase or even, if necessary, set up the entire lubricant supply through the restricted orifice 60 and thereby independently of the filter 26' so that proper lubrication of the bearings and other parts will be assured, at all times.

The arrangement of one pumping element in the inlet to the filter and another in the outlet leading to the bearings assures proper feeding of the lubricant through the filter and from it to the bearings at all times.

It is to be understood that the particular by-pass control provision may be varied to meet the particular requirements, as already pointed out, and the filter may be formed to remove any desired matter from the lubricant and its capacity may also, of course, be varied, as desired.

I claim:

In combination, an internal combustion engine having a crank case and parts to be lubricated, a lubricant system for supplying lubricant to said parts, a filter in said lubricant system, a shaft extending into the crank case and connected to be driven by the engine, a pair of pumps on said shaft and disposed within the crank case, one of said pumps having an inlet for withdrawing lubricant from the crank case and an outlet for delivering to the filter, the other pump having an inlet from the filter and an outlet to the parts to be lubricated, and means for by-passing said filter and connecting the outlet from said first pump directly with the inlet to said second pump.

In witness whereof, I hereunto subscribe my name this 3rd day of June, 1925.

HARRY L. HORNING.